United States Patent
Porpiglia et al.

(10) Patent No.: US 11,854,373 B2
(45) Date of Patent: Dec. 26, 2023

(54) OPEN ARCHITECTURE, REAL TIME, MULTI-INPUT THREAT CORRELATION

(71) Applicant: BAE Systems Information and Electronic Systems Integration Inc., Nashua, NH (US)

(72) Inventors: Andrew M. Porpiglia, Nashua, NH (US); Kyle W. Flynn, Merrimack, NH (US); Brian A. Harris, Bedford, NH (US); Timothy J. O'Donnell, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1030 days.

(21) Appl. No.: 16/628,126

(22) PCT Filed: Jul. 5, 2017

(86) PCT No.: PCT/US2017/040714
§ 371 (c)(1),
(2) Date: Jan. 2, 2020

(87) PCT Pub. No.: WO2019/009890
PCT Pub. Date: Jan. 10, 2019

(65) Prior Publication Data
US 2020/0133685 A1  Apr. 30, 2020

(51) Int. Cl.
*G08B 29/18* (2006.01)
*G06F 17/15* (2006.01)
(Continued)

(52) U.S. Cl.
CPC .......... *G08B 29/188* (2013.01); *G01S 13/726* (2013.01); *G06F 17/15* (2013.01);
(Continued)

(58) Field of Classification Search
CPC .......................... G08B 29/188; G01S 13/726
See application file for complete search history.

(56) References Cited

U.S. PATENT DOCUMENTS 4,794,313 A  12/1988  Ohmen
7,454,442 B2 * 11/2008  Cobleigh ................ G06F 16/29
(Continued)

FOREIGN PATENT DOCUMENTS

WO  2016187112 A1  11/2016

OTHER PUBLICATIONS

International Search Report, PCT/US17/40714, dated Sep. 14, 2017, 9 pages.

*Primary Examiner* — Marcus E Windrich
(74) *Attorney, Agent, or Firm* — Scott J. Asmus; Gary McFaline; Maine Cernota & Curran

(57) ABSTRACT

A system and method for combining the inputs of various sensors used in platforms, primarily those having a military use, having or making use of a number of inputs capable of determining information about an environment in which they are operating. Each input is configured to output a standardized set of information regarding its capabilities and the environment in which it is operating. A correlator is configured to adaptably process the information based on rules contained in at least one changeable correlation matrix and information contained in at least one changeable configuration file. The information, or simply an alert, is provided to at least one output that provides the information to a human operator.

18 Claims, 4 Drawing Sheets

(51) Int. Cl.
- *G06F 17/16* (2006.01)
- *G08B 26/00* (2006.01)
- *G08B 29/02* (2006.01)
- *G01S 13/72* (2006.01)

(52) U.S. Cl.
CPC ........... *G06F 17/16* (2013.01); *G08B 26/008* (2013.01); *G08B 29/02* (2013.01)

(56) References Cited

U.S. PATENT DOCUMENTS

| | | | |
|---|---|---|---|
| 2003/0186663 A1* | 10/2003 | Chen | G06T 5/40 |
| | | | 455/226.3 |
| 2004/0189521 A1 | 9/2004 | Smith et al. | |
| 2004/0268111 A1 | 12/2004 | Dayan et al. | |
| 2005/0190951 A1* | 9/2005 | Shyu | G01S 13/726 |
| | | | 382/281 |
| 2010/0214410 A1* | 8/2010 | McClure | G08B 13/19615 |
| | | | 382/103 |
| 2012/0089523 A1 | 4/2012 | Hurri et al. | |
| 2013/0159350 A1* | 6/2013 | Sankar | G06F 3/017 |
| | | | 707/E17.005 |
| 2014/0310739 A1* | 10/2014 | Ricci | G06Q 20/321 |
| | | | 725/75 |
| 2021/0232642 A1* | 7/2021 | Ricci | A61B 5/742 |
| 2022/0260710 A1* | 8/2022 | Lee | G01S 17/931 |
| 2022/0299626 A1* | 9/2022 | Chen | G01S 7/412 |
| 2022/0332311 A1* | 10/2022 | Kim | G01S 13/931 |

\* cited by examiner

| Field | Parameter | Explanation |
|---|---|---|
| 1 | Input Type | Type of input system (RF, Sonar, Optical, etc., or Undefined) |
| 2 | Object ID | # assigned by input so that OAC can match any later updates |
| 3 | Object Type | Defined list of objects (Plane, Rocket, Undefined, Other, etc.) |
| 4 | Object State | Can indicate handling states (New, Update, Dormant, Delete, etc.) or physical states like (Launch, Boost, Re-entry, etc.) |
| 5 | Component | Type of component measured (Position, Weight, Color, etc.) |
| 6 | Measurement | Quantified measurement in degrees, pounds, wavelength, etc. |
| 7 | Error Size | Uncertainty or error bars in measurement |
| 8 | Error Type | Error statistics that apply (Max, RMS, 1sigma, 2sigma, etc.) |
| 9 | Measurement Time | Timestamp when measurement was made |
| 10 | Message Time | Timestamp when this message was sent |
| 11 | Synch Time | Timestamp from most recent OAC time sync update |

Figure 3

|  | Inp1-Obj1-State1 | Inp1-Obj1-State2 | ... | Inp1-Obj2-State1 | ... | Inp2-Obj1-State1 | ... | Inp#-Obj#-State# |
|---|---|---|---|---|---|---|---|---|
| Inp1-Obj1-State1 | Rule1 | Rule2 | ... | Rule# | ... | Rule# | ... | Rule# |
| Inp1-Obj1-State2 | Rule3 | Rule4 | ... | Rule# | ... | Rule# | ... | Rule# |
| ... | ... | ... | ... | ... | ... | ... | ... | ... |
| Inp1-Obj2-State1 | Rule# | Rule# | ... | Rule# | ... | Rule# | ... | Rule# |
| ... | ... | ... | ... | ... | ... | ... | ... | ... |
| Inp2-Obj1-State1 | Rule# | Rule# | ... | Rule# | ... | Rule# | ... | Rule# |
| ... | ... | ... | ... | ... | ... | ... | ... | ... |
| Inp#-Obj#-State# | Rule# | Rule# | ... | Rule# | ... | Rule# | ... | Rule# |

Figure 4

OPEN ARCHITECTURE, REAL TIME, MULTI-INPUT THREAT CORRELATION

STATEMENT OF GOVERNMENT INTEREST

The invention was made with United States Government support under Contract No. H94003-04-D-0002, DO0090 awarded by the U.S. Air Force. The United States Government has certain rights in this invention.

FIELD

The present disclosure relates to multi-input event correlation, and more particularly, to multi-input event correlation in the context of suites of multiple threat warning systems.

BACKGROUND

Many military platforms are equipped with multiple threat warning systems, which provide for the detection of missiles and other threats near the platforms. As the capability of these systems has grown, they have begun to overlap and provide separate, independent notifications to the crews of those platforms. While this offers tremendous potential for data fusion, it also presents a formidable challenge to the crew. For instance, where a crewmember receives multiple alarms from multiple systems simultaneously, the crewmember may be unable to quickly determine whether those alarms indicate a single threat or multiple distinct threats, resulting in a delayed or inappropriate response at this critical time.

Making such distinctions correctly is critical to the very survival of such crews and their success largely depends on their being intimately familiar with the operational details, capabilities, and idiosyncrasies of each of the contributing systems. Updates and changes to these systems over time compounds the difficulty of this task. Even in the absence of changes to the systems themselves, changes in the environment in which they are operating can cause distinct changes in their behavior.

Furthermore, design differences and ongoing modification of each of the systems used on any particular platform results in difficulties unifying them. Without a more generalized and flexible solution, distinguishing between the multiple threat warning systems present on modern platforms requires coordinating software development efforts between the systems, which can be expensive and time consuming.

Present approaches to resolve this issue are system-specific. Interfaces combining the inputs of the multiple systems are custom-designed and the behavior of the contributing systems is hard-coded. This results in limited flexibility and significant expense when changes are needed, with changes often requiring replacement of hardware components. Furthermore, these interfaces do not request or otherwise obtain the information they need to provide a generalized solution, resulting in a lack of extensibility. They also do not allow a new input to arrive 'unexpectedly'. This results in additional costly and time-consuming software and hardware development.

What is needed, therefore, are techniques for generalizing a solution to the problem of providing a system that allows crewmembers to readily distinguish between single and multiple threats, specifically when using multiple threat warning systems. The solution should not require advanced knowledge of the contributing systems, allow the component systems to evolve over time without significant impact on the overall system, and also allow new systems be added without requiring significant rework of the entire system.

SUMMARY

One embodiment of the present disclosure provides a system for federating independent inputs, the system comprising: a plurality of inputs capable of determining information about an environment in which they are operating, wherein each input is configured to output a standardized set of information regarding its capabilities and the environment in which it is operating; and a correlator in operative communication with the plurality of inputs, wherein the correlator is configured to adaptably process the standardized set of information based on rules contained in at least one changeable correlation matrix and information contained in at least one changeable configuration file; at least one output in operative communication with the correlator whereby the correlator may provide information and/or notifications to a human operator.

Another embodiment of the present disclosure provides such a system wherein the correlator is configured to automatically determine whether data received from two or more of the plurality of inputs concerns a single object of interest or multiple objects of interest before outputting information and/or notifications to the at least one output.

A further embodiment of the present disclosure provides such a system wherein the correlator is configured to compare information received from two or more of the plurality of inputs and automatically determine the most accurate response before outputting information and/or notifications to the at least one output.

Yet another embodiment of the present disclosure provides such a system wherein the correlator is configured to compare information received from two or more inputs and automatically determine whether the information or a notification should be suppressed or output to the at least one output.

A yet further embodiment of the present disclosure provides such a system wherein the correlator is configured to process data comprising: input type; object ID; object type; object state; component; measurement; error size; error type; measurement time; message time; and synch time.

Still another embodiment of the present disclosure provides such a system wherein the inputs are federated prior to being input into the correlator.

A still further embodiment of the present disclosure provides such a system wherein the configuration file contains information used by the correlator to automatically configure inputs added to the system.

Even another embodiment of the present disclosure provides such a system wherein the configuration file is used by the correlator to automatically detect and configure, during a boot sequence, inputs added to the system.

An even further embodiment of the present disclosure provides such a system wherein the correlation matrix is used by the correlator to automatically detect and configure inputs added to the system during run-time.

A still even another embodiment of the present disclosure provides such a system wherein inputs notify the correlator of their presence during run-time through the use of announcement messages.

A still even further embodiment of the present disclosure provides such a system wherein the correlator operates in accordance with the following rule: IF DiffFunction(Comp1, Comp2, Time1, Time2)<ErrorFunction(Err1, Err2, ErrType1, ErrType2) THEN {CORRELATE} ELSE {SEPA- RATE}, wherein a result of "correlate" indicates that the separate detections should be combined prior to being provided to the at least one output and wherein a result of "separate" indicates that the separate detections should be separately provided to the at least one output.

Still yet another embodiment of the present disclosure provides such a system wherein the correlator is in bidirectional communication with the plurality of inputs.

A still yet further embodiment of the present disclosure provides such a system wherein at least one of the at least one outputs is a monitor.

Even yet another embodiment of the present disclosure provides such a system wherein at least one of the at least one outputs is a speaker.

One embodiment of the present disclosure provides a method of federating independent inputs, the method comprising: configuring a plurality of inputs capable of determining information about an environment in which they are operating to each output a standardized set of information regarding its capabilities and the environment in which it is operating; connecting the plurality of inputs to a correlator configured to process the standardized set of information based on rules contained in at least one changeable correlation matrix and information contained in at least one changeable configuration file; using the correlator, processing the standardized set of information and outputting the processed standardized set of information to at least one output in operative communication with the correlator.

Another embodiment of the present disclosure provides such a method wherein the correlator is configured to automatically determine whether data received from two or more of the plurality of inputs concerns a single object of interest or multiple objects of interest before outputting information and/or notifications to the at least one output.

A further embodiment of the present disclosure provides such a method wherein the correlator is configured to compare information received from two or more of the plurality of inputs and automatically determine the most accurate response before outputting information and/or notifications to the at least one output.

Yet another embodiment of the present disclosure provides such a method wherein the correlator is configured to compare information received from two or more inputs and automatically determine whether the information or a notification should be suppressed or output to the at least one output.

One embodiment of the present disclosure provides a vehicle, the vehicle comprising: a system for federating independent inputs, the system comprising: a plurality of inputs capable of determining information about an environment in which they are operating, wherein each input is configured to output a standardized set of information regarding its capabilities and the environment in which it is operating; and a correlator in operative communication with the plurality of inputs, wherein the correlator is configured to adaptably process the standardized set of information based on rules contained in at least one changeable correlation matrix and information contained in at least one changeable configuration file; at least one output in operative communication with the correlator whereby the correlator may provide information and/or notifications to a human operator.

Another embodiment of the present disclosure provides such a vehicle wherein the vehicle further comprises an interface allowing modification of the at least one correlation matrix and at least one configuration file.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3 is a table containing OAC message examples, in accordance with embodiments of the present disclosure; and FIG. 4 is an OAC correlation matrix, in accordance with embodiments of the present disclosure.

DETAILED DESCRIPTION

Figure 1:
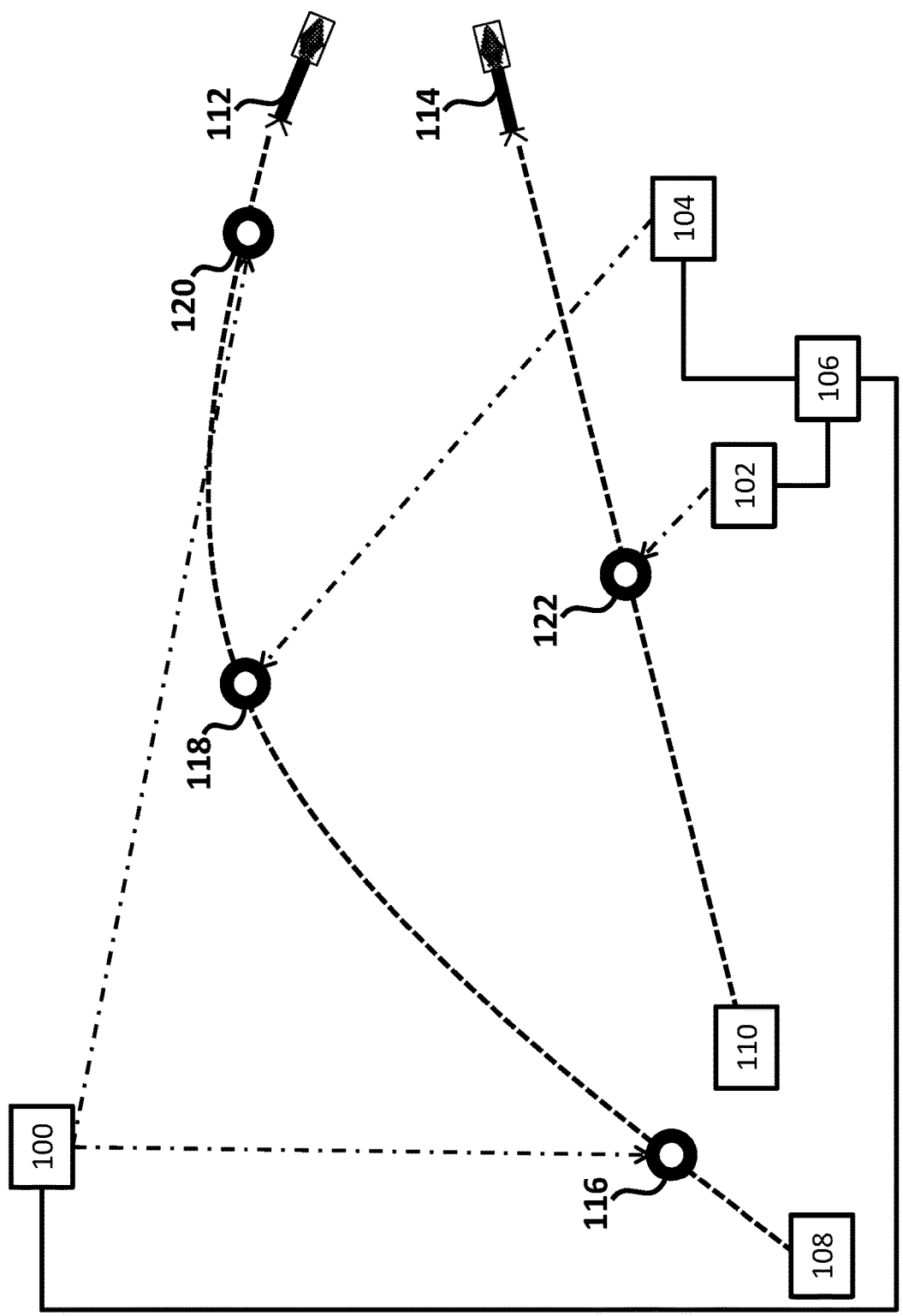
FIG. 1 is an illustration of an Open Application Correlator (OAC), in accordance with embodiments of the present disclosure.

The present disclosure concerns a system and method that allows for a more generic and flexible solution to unification of the multiple threat warning systems in use today, that is able to accommodate those systems yet to be put into use. Embodiments provide for the defining of an open-architecture threat 'message' that any number of systems can send to a module, herein referred to as a Open Application Correlator (OAC) 106, to be appropriately paired or kept separate. In embodiments, the OAC 106 may use the information obtained from the systems to provide more accurate information to crewmembers than any single system could provide on its own.

Embodiments also provide for the auto-configuration of input systems using predefined logic rules. An OAC 106 in accordance with such embodiments uses these rules to merge inputs without any particular contributions from any particular input system 100/102/104. Embodiments further provide an interface message 208 protocol that defines the key parameters the input systems 100/102/104 need to provide the OAC 106 to enable its real-time decision-making. In embodiments, these parameters include four general categories of information: the type of measurement being made (e.g. size, weight, location, color); the error bars/accuracy of each measurement (e.g. rms degrees or max meters that could be fixed or variable); the state of the object the system is present on at the time of the measurement (e.g. 'takeoff', 'climb', 'cruising', 'descent', and 'landing'); and a common time reference, which is used to sync measurements from the various input systems 100/102/104.

In embodiments, the content of an OAC interface message 208 is limited to roughly a dozen parameters. Using this relatively small number of parameters, an OAC interface message 208 processed in accordance with embodiments of the present disclosure is able to provide sufficient information to the OAC 106, so as to allow it to interpret the data obtained from component input systems 100/102/104. The OAC 106 integrates the inputs of these multiple threat warning systems. The message may be interpreted using a matrix of rules, herein referred to as a correlation matrix 204. This matrix 204 anticipates nothing in particular, but is prepared to evaluate whatever data may be received. These rules may, in embodiments, also accommodate "unknown" or "uncertain" parameters from the input systems 100/102/104.

By way of example, a threat engagement presents a series of potential observable components ($C_1$-$C_n$) that may or may not be detected. Any given input system 100/102/104 of a suite of multiple threat warning systems in accordance with embodiments of the present disclosure may be able to detect some or all of these observable components at a measured time (T) and a measured location (L). These time and location measurements have accuracies or 'error bars' that may be fixed or variable for different components across different engagements.

Consider two different measurements (M1 and M2) made either by two different federated input systems, or even made sequentially by the same input system (e.g. M1={ThreatType$_1$, Component$_1$, Time$_1$, Location$_1$, TError$_1$, LError$_1$} and M2={ThreatType$_2$, Component$_2$, Location$_2$, TError$_2$, LError$_2$}). If these two messages are provided to the OAC 106, the OAC 106 can merge these observable components and values into an integrated, coherent output 202 using a series of correlated rules. In embodiments, the integrated, coherent output 202 comprises an appropriate alert. In other cases, the OAC 106 may suppress some or all of the information provided by the input system 100/102/104, if duplicative or otherwise extraneous.

An example rule used in embodiments of the OAC 106 is:
IF DiffFunction(Comp$_1$, Comp$_2$, Time$_1$, Time$_2$)<ErrorFunction(Err$_1$, Err$_2$, ErrType$_1$, ErrType$_2$) THEN {CORRELATE} ELSE {SEPARATE}

This rule evaluates the difference in report times within the context of which components are being measured. In other words, there can be an expected difference in measurement times for different features of the same object, much like lightning is visible before its corresponding thunder is heard. In embodiments, if this compensated time difference is assessed to be smaller than the expected errors within the measurements, the reports will be correlated and merged. Otherwise, they will remain allocated to separate objects.

In embodiments, these measurements and values can be federated, or unified, while remaining identifiable and separable, prior to being input to the OAC 106 of the present disclosure.

Now referring to FIG. 1, an Open Application Correlator (OAC) 106 having three input systems, input system 1 100, input system 2 102, and input system 3 104, is shown. FIG. 1 further shows a first threat 108 and a second threat 110.

Each threat shown in FIG. 1 is depicted as having launched a projectile whose path of travel is shown using dotted lines, with the first threat 108 having launched a first projectile 112 and the second threat 110 having launched a second projectile 114. The three input systems 100/102/104 track the two projectiles 112/114, with input system 1 100 measuring the first projectile at point 1 116 and point 3 120, input system 2 102 measuring the second projectile 114 at point 4 122, and input system 3 104 measuring the first projectile at point 2 118.

In embodiments, the OAC 106 dynamically integrates these 4 measurements 116/118/120/122 from the 3 distinct input systems 100/102/104 to understand the two projectiles 112/114. Using this information, the OAC 106 can then provide the relevant information to crewmembers without duplication and with better accuracy as compared to separate crew notification by the inputs 100/102/104, as was the case in prior art multiple threat warning systems.

Figure 2:
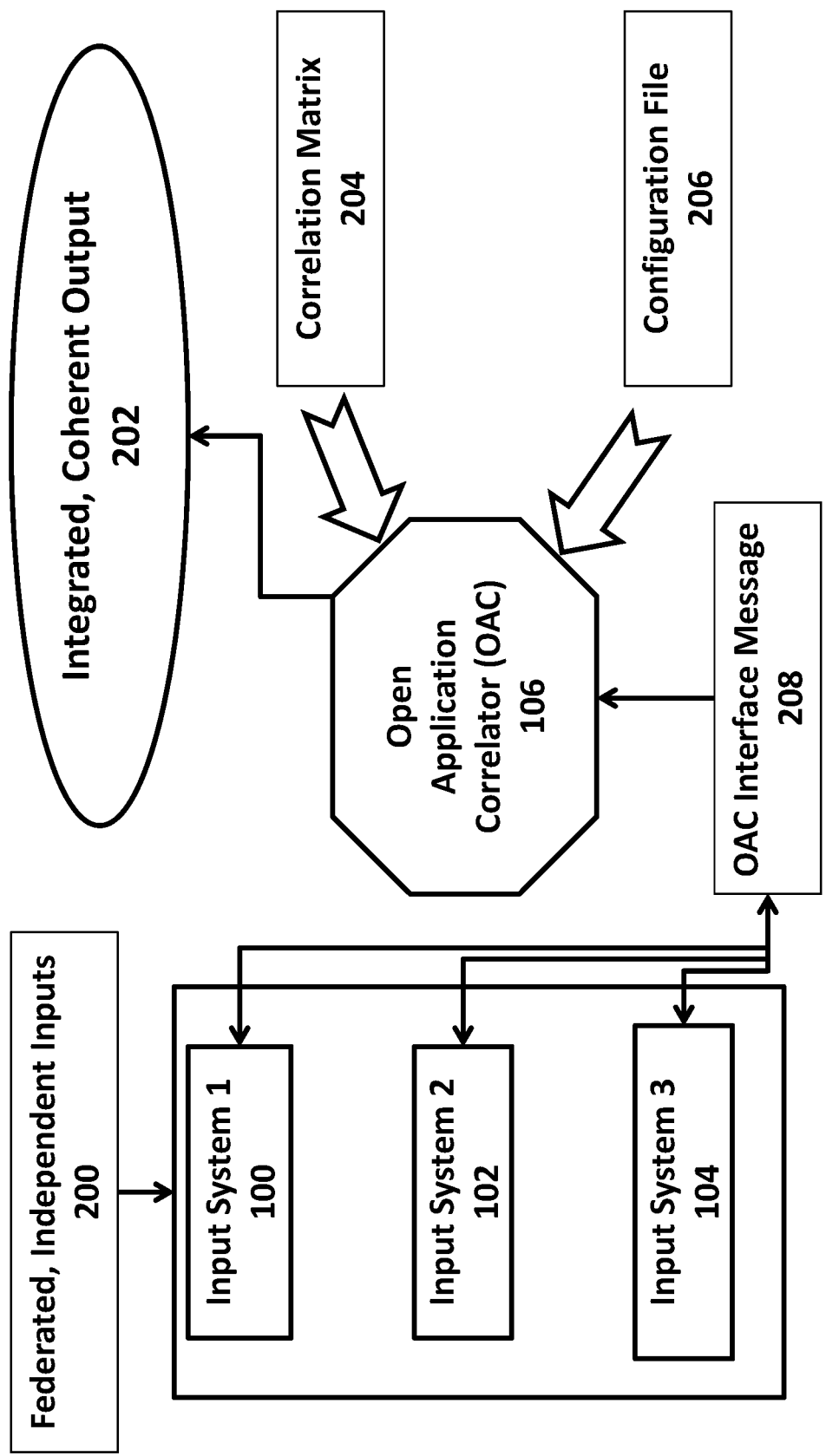
FIG. 2 is a diagram of the OAC Architecture, in accordance with embodiments of the present disclosure.

FIG. 2 describes, using a schematic, the function of the OAC 106, in accordance with embodiments of the present disclosure. In this system, input systems 1-3 100/102/104, which, in prior art systems, would issue separate alerts, are combined by the OAC 106 and may be considered federated, independent inputs 200. Specifically, input systems 1-3 100/102/104 each provide separate OAC Interface Messages 208 to the OAC 106. This is in contrast to previous systems where input systems directly resulted in the conveyance of an alarm or other information to the crew. The OAC 106 then analyzes the OAC Interface Messages 208 and determines the appropriate notification(s) to provide to the crew, refraining from duplicating information ascertained by multiple systems and thereby assisting the crew in appropriately responding to threats. The OAC 106 may also provide feedback, such as synchronization data, to the inputs 100/102/104, where necessary.

Inputs to the OAC 106 further comprise at least one correlation matrix 204 and, in embodiments, at least one configuration file 206. Correlation Matrix 204 is the compilation of all such correlation rules exemplified by the single instance in, but extended to cover the possible scenarios of all measurements of all components by all input systems. It allows the OAC 106 to determine how best to combine the federated inputs 100/102/104 into an integrated, coherent output 202, or suppress them.

The configuration file 206 of embodiments contains "personality settings" that are used to tailor OAC 106 behavior to adapt to different modifications, such as different host platforms or input system configurations. In embodiments, the configuration file 206 may be readily modified to accommodate new systems and/or resolution of issues that may crop up from time to time, even in real-time using a protocol that allows new inputs to 'announce' themselves and join the correlation matrix 204.

In embodiments, the correlation matrix 204 comprises a predefined set of rules that run in software stored on a non-transitory storage medium of the OAC 106. The correlation matrix 204 is independent from the input systems 100/102/104 and allows the OAC 106 to adapt dynamically to messages received therefrom.

In embodiments, communication between the OAC 106 and the inputs 100/102/104 is bidirectional, enabling the OAC to request additional information from the inputs where necessary or desired.

Automatic configuration of inputs may be accomplished in a number of ways. In embodiments, the configuration file 206 enables automatic configuration of inputs. This may be considered a boot time type configuration. Alternatively, the OAC Interface message 208 of embodiments allows input systems to communicate their presence to the OAC 106 through "announcement" messages, which, in embodiments, are sent at run-time. Neither approach involves updates to the OAC 106 or correlation matrix 204.

Now referring to FIG. 3, an example of an OAC interface message 208 is shown. The intent of this figure was to show a relatively simplistic view to convey the general concept, as opposed to limiting the application of the present disclosure. A single OAC interface message 208, in embodiments, may contain multiple component measurements.

FIG. 4 shows an OAC correlation matrix 204 and rule example in table form, in accordance with embodiments of the present disclosure. In embodiments, rules, like the example rule in, inhabit each cell and govern the correlation criteria for each input object pairing defined by the row and column for each cell. The population of cells therefore covers every possible combination of federated inputs.

There are several applications where it would be beneficial to sort through measurement data from multiple, uncoordinated input systems in order to create an integrated picture of 'reality'. While the present disclosure focuses on this problem in the context of a multiple threat warning system, it could equally apply to any system using multiple input systems, especially those that are relatively complex. Examples include: an aircraft landing aide that blends radar, altimeter, and optical inputs; a targeting system that uses passive and active optical inputs (e.g. sensors and lasers); and a collision avoidance system that uses radar, optics, and acoustic sensors.

One challenge to all of these applications is that the behavior of the OAC 106 is driven by knowing details of the specific capabilities of each input, and specific configuration software loads that define 'who' and 'what' will be contributing. This disclosure provides the framework necessary to overcome that challenge, allowing the OAC 106 to configure itself in real-time, to work with '1 to N' inputs without any a priori knowledge or updates.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A system for federating independent inputs, the system comprising:
   a plurality of inputs having information about an environment in which they are operating, wherein each input is configured to output a standardized set of information regarding its capabilities and the environment in which it is operating; and
   a correlator in operative communication with said plurality of inputs, wherein said correlator is configured to adaptably process said standardized set of information based on rules contained in at least one changeable correlation matrix and information contained in at least one changeable configuration file;
   wherein the correlator operates in accordance with the following rule:
      IF DiffFunction(Comp1, Comp2, Time1, Time2)<ErrorFunction(Err1, Err2, ErrType1, ErrType2) THEN {CORRELATE} ELSE {SEPARATE}
   wherein:
      Comp1 is a measurement associated with a first component;
      Comp2 is a measurement associated with a second component;
      Time 1 is a report time of a measurement taken by the first component;
      Time 2 is a report time of a measurement taken by the second component;
      Err1 is a measure of uncertainty associated with the measurement associated with the first component;
      Err2 is a measure of uncertainty associated with the measurement associated with the second component;
      ErrType1 is an error type of the measure of uncertainty associated with the measurement associated with the first component;
      ErrType2 is an error type of the measure of uncertainty associated with the measurement associated with the second component;
      wherein a result of "correlate" indicates that the separate detections should be combined prior to being provided to said at least one output and wherein a result of "separate" indicates that the separate detections should be separately provided to said at least one output; and
   at least one output in operative communication with said correlator whereby said correlator may provide information and/or notifications to a human operator.

2. The system of claim 1 wherein said correlator is configured to automatically determine whether data received from two or more of the plurality of inputs concerns a single object of interest or multiple objects of interest before outputting information and/or notifications to said at least one output.

3. The system of claim 1 wherein said correlator is configured to compare information received from two or more inputs and automatically determine whether the information or a notification should be suppressed or output to said at least one output.

4. The system of claim 1 wherein said correlator is configured to process data comprising: input type; object ID; object type; object state; component; measurement; error size; error type; measurement time; message time; and synch time.

5. The system of claim 1 wherein said inputs are federated prior to being input into said correlator.

6. The system of claim 1 wherein said configuration file contains information used by the correlator to automatically configure inputs added to the system.

7. The system of claim 1 wherein said configuration file is used by the correlator to automatically detect and configure, during a boot sequence, inputs added to the system.

8. The system of claim 1 wherein said correlation matrix is used by the correlator to automatically detect and configure inputs added to the system during run-time.

9. The system of claim 8 wherein inputs notify said correlator of their presence during run-time through the use of announcement messages.

10. The system of claim 1 wherein said correlator is in bidirectional communication with said plurality of inputs.

11. The system of claim 1 wherein at least one of said at least one outputs is a monitor.

12. The system of claim 1 wherein at least one of said at least one outputs is a speaker.

13. A method of federating independent inputs, the method comprising:
   configuring a plurality of inputs having information about an environment in which they are operating to each output a standardized set of information regarding its capabilities and the environment in which it is operating;
   connecting the plurality of inputs to a correlator configured to process said standardized set of information based on rules contained in at least one changeable correlation matrix and information contained in at least one changeable configuration file;
   using the correlator, processing said standardized set of information and outputting said processed standardized set of information to at least one output in operative communication with said correlator;
   wherein the correlator operates in accordance with the following rule:
      IF DiffFunction(Comp1, Comp2, Time1, Time2)<ErrorFunction(Err1, Err2, ErrType1, ErrType2) THEN {CORRELATE} ELSE {SEPARATE}
   wherein:
      Comp1 is a measurement associated with a first component;
      Comp2 is a measurement associated with a second component;

Time 1 is a report time of a measurement taken by the first component;
Time 2 is a report time of a measurement taken by the second component;
Err1 is a measure of uncertainty associated with the measurement associated with the first component;
Err2 is a measure of uncertainty associated with the measurement associated with the second component;
ErrType1 is an error type of the measure of uncertainty associated with the measurement associated with the first component;
ErrType2 is an error type of the measure of uncertainty associated with the measurement associated with the second component;
wherein a result of "correlate" indicates that the separate detections should be combined prior to being provided to said at least one output and wherein a result of "separate" indicates that the separate detections should be separately provided to said at least one output.

14. The method of claim 13 wherein said correlator is configured to automatically determine whether data received from two or more of the plurality of inputs concerns a single object of interest or multiple objects of interest before outputting information and/or notifications to said at least one output.

15. The system of claim 13 wherein said correlator is configured to compare information received from two or more of the plurality of inputs and automatically determine the most accurate response before outputting information and/or notifications to said at least one output.

16. The system of claim 13 wherein said correlator is configured to compare information received from two or more inputs and automatically determine whether the information or a notification should be suppressed or output to said at least one output.

17. A vehicle, the vehicle comprising:
a system for federating independent inputs, the system comprising:
a plurality of inputs having information about an environment in which they are operating, wherein each input is configured to output a standardized set of information regarding its capabilities and the environment in which it is operating; and
a correlator in operative communication with said plurality of inputs, wherein said correlator is configured to adaptably process said standardized set of information based on rules contained in at least one changeable correlation matrix and information contained in at least one changeable configuration file, wherein the correlator operates in accordance with the following rule:
IF DiffFunction(Comp1, Comp2, Time1, Time2)<ErrorFunction(Err1, Err2, ErrType1, ErrType2) THEN {CORRELATE} ELSE {SEPARATE}
wherein:
Comp1 is a measurement associated with a first component;
Comp2 is a measurement associated with a second component;
Time 1 is a report time of a measurement taken by the first component;
Time 2 is a report time of a measurement taken by the second component;
Err1 is a measure of uncertainty associated with the measurement associated with the first component;
Err2 is a measure of uncertainty associated with the measurement associated with the second component;
ErrType1 is an error type of the measure of uncertainty associated with the measurement associated with the first component;
ErrType2 is an error type of the measure of uncertainty associated with the measurement associated with the second component;
wherein a result of "correlate" indicates that the separate detections should be combined prior to being provided to said at least one output and wherein a result of "separate" indicates that the separate detections should be separately provided to said at least one output;
at least one output in operative communication with said correlator whereby said correlator may provide information and/or notifications to a human operator.

18. The vehicle of claim 17 wherein said vehicle further comprises an interface allowing modification of said at least one correlation matrix and at least one configuration file.

* * * * *